Dec. 26, 1944.  J. J. ZIMMERMAN  2,365,987
METAL SAW AND HYDRAULIC CONTROL MECHANISM
Filed June 10, 1942   6 Sheets-Sheet 1

FIG 1.

Inventor
JAMES JOB ZIMMERMAN
By
H H Oldham, Attorney

Dec. 26, 1944.　　　J. J. ZIMMERMAN　　　2,365,987
METAL SAW AND HYDRAULIC CONTROL MECHANISM
Filed June 10, 1942　　　6 Sheets-Sheet 3

Inventor
JAMES JOB ZIMMERMAN

By A. H. Oldham
Attorney

Dec. 26, 1944. J. J. ZIMMERMAN 2,365,987
METAL SAW AND HYDRAULIC CONTROL MECHANISM
Filed June 10, 1942 6 Sheets-Sheet 5

Fig 12.

Inventor
JAMES JOB ZIMMERMAN
By
H H Oldham Attorney

Patented Dec. 26, 1944

2,365,987

UNITED STATES PATENT OFFICE 2,365,987

METAL SAW AND HYDRAULIC CONTROL MECHANISM

James Job. Zimmerman, Canton, Ohio, assignor to The Bonnot Company, Canton, Ohio, a corporation Application June 10, 1942, Serial No. 446,451

13 Claims. (Cl. 29—69)

This invention relates to hydraulic control mechanisms and to hydraulically controlled saws, and particularly to hydraulically controlled saws of the type adapted to saw large steel billets and the like.

It is the general object of my invention to provide a relatively inexpensive, easily operated, and substantially fool-proof metal saw adapted to rapidly and efficiently perform a wide variety of sawing operations upon substantially any type of metallic member, and, particularly, upon metal billets and the like, and with the saw being characterized by high surface cutting speed and light feed.

Another object of my invention is the provision of an improved metal saw including an easily controlled, long-wearing, efficient, and flexible hydraulic control mechanism.

Another object of my invention is the provision of an hydraulically controlled metal saw having vertical feeding movement and hydraulically controlled work clamping vises with interlocking means for preventing the operation of the vises during the cutting movement of the saw.

Another object of my invention is to provide inexpensive and improved feed control mechanism readily permitting any one of a wide variety of feeding speeds and a safety-type, extra-fast feeding speed, and automatic readily adjusted means for reversing the feeding movement of the saw carriage and for automatically stopping the carriage at the end of its return movement.

Another object of my invention is the provision of improved means for mounting one or more rotary saw blades in conjunction with the remainder of the apparatus and on cantilever bearings with a minimum of overhang.

Another object of my invention is to provide a pair of work clamping vises and associated hydraulic control means and adapted to clamp the work only on one selected side of the plane of the saw.

Another object of my invention is the provision of a metal saw of the character described and including a pair of saw blades adapted to simultaneously cut through a billet or the like and to provide a thin metallurgical sample thereof.

Another object of my invention is to provide a metal saw of the type described and having improved means connecting the hydraulic cylinders and the movable carriage.

Another object of my invention is the provision of an improved hydraulic control system for metal saws and the like.

The foregoing objects of my invention, and other objects which will become apparent as the description proceeds, are achieved by the provision of improved apparatus and mechanisms particularly illustrated in one best known embodiment in the accompanying drawings wherein.

Figure 1:
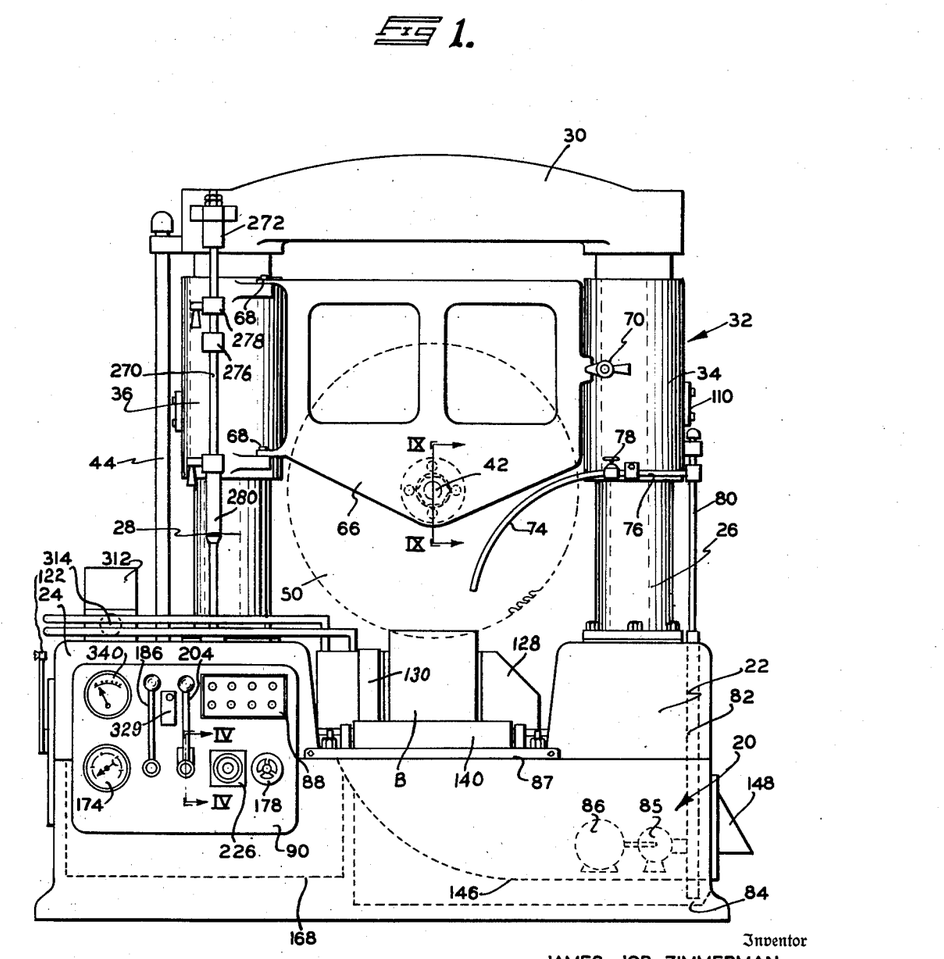
Fig. 1 is a front elevation of an apparatus constructed in accordance with the principles of my invention.
Figure 2:
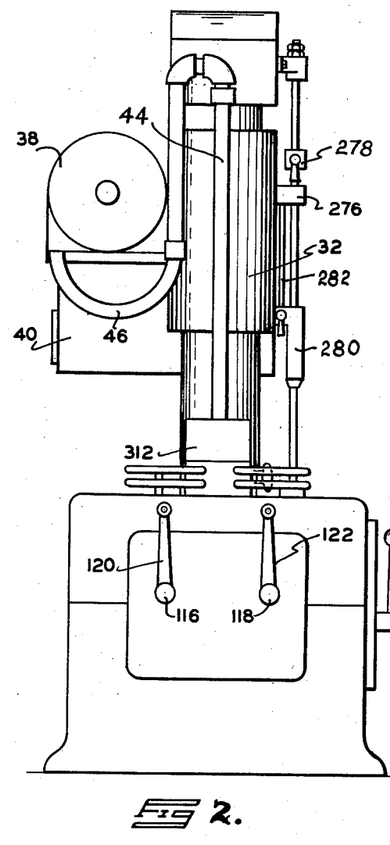
Fig. 2 is an end elevation of the apparatus shown in Fig. 1.

Referring to the drawings, the numeral 20 indicates generally the bed or base of the apparatus which is of elongated substantially rectangular form, and upon the ends of which are mounted pedestals 22 and 24. The pedestal 22 carries a column 26 of hollow cylindrical shape, and the pedestal 24 supports a column 28 likewise of hollow cylindrical shape. The columns 26 and 28 are connected together at their tops by a head portion 30. Slidably supported on the columns 26 and 28 is a carriage, indicated as a whole by the numeral 32, having a hub-like-end portions 34 and 36 appropriately bored to slidably receive the columns 26 and 28. The carriage 32 carries an electric motor 38 operating through a variable speed gear box 40 to drive a shaft or arbor 42 journalled horizontally and in cantilever bearings 43 between the columns 26 and 28 and at right angles thereto. Electric current is supplied to the motor 38 by way of a conduit 44 extending between the pedestal 24 and the head portion 30 and having a flexible extension 46 permitting the raising and lowering of the carriage 32 without effecting the supply of electric current to the motor 38.

Figure 9:
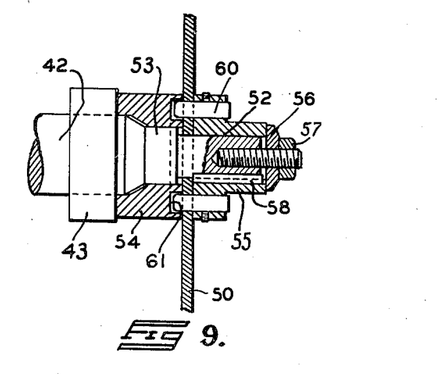
Fig. 9 is a longitudinal cross-sectional view, on a larger scale, and taken substantially on line IX—IX of Fig. 1.

As best illustrated in Fig. 9, the arbor 42 carries a saw disk or blade 50, preferably on the center line of the columns 26 and 28. The mounting of the saw blade is preferably achieved by reducing the diameter of the arbor at its end, as at 53, and then again as at 52, with the reduced end 53 slidably receiving a spacer 54 which engages with the inner ring of bearing 43 and with the side of the saw blade 50. The reduced end 52 of the arbor 42 slidably receives a driving hub 55 removably held thereon by a washer 56, and nut 57, with the hub 55 being keyed, as at 58, to the reduced end of the shaft 52. The hub 55 carries a plurality, such as four, of circumferentially spaced driving pins 60 which are received in suitable apertures in the saw blade 50 and extend into a circular groove 61 in the spacer 54.

The structure illustrated in Fig. 9 and just described permits bringing the saw blade 50 very close to the bearing 43 so as to reduce the amount of overhang of the arbor 42. This is because the means for securing the saw blade to the arbor are not between the blade and the bearing but are secured to the arbor and the blade on the side of the blade remote from the bearing. Further, this construction eliminates damage to the arbor 42 in case of stoppage of the saw blade for any reason because the driving hub 55 will break or shear before the arbor 42 or any of the driving mechanism therefore is damaged. Conveniently, the hub 55 is made of cast iron or other material of lower physicals than the remaining parts in the assembly just described.

Figure 14:
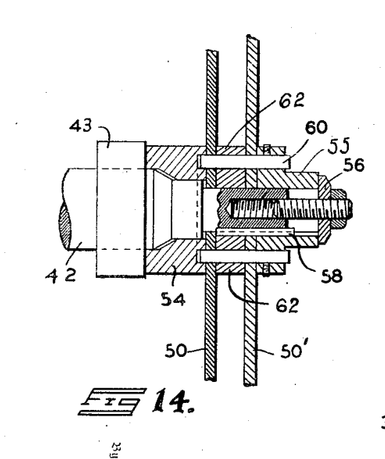
Fig. 14 is a view similar to Fig. 9 but illustrating the mounting of a pair of saw blades.

While on the subject of mounting the saw blade, attention is directed to Fig. 14 of the drawings which illustrates apparatus substantially the same as that of Fig. 9 but adapted to mount an additional saw blade 50'. This is achieved merely by using a collar 62, which may be keyed to the extension 52 of the arbor 42, and positioned between the blades 50 and 50', and by lengthening the pins 60. The advantage of two saw blades on the arbor is that one of the blades will function to make the usual cut on the end of the work piece and the other blade will function to cut off a relatively thin slice of the work which slice will serve as a metallurgical sample. Making two cuts simultaneously will save a great deal of production time.

The side of the carriage 32 opposite the motor 38 includes a cover plate 66 suitably hinged, as at 68, to the hub portion 36 of the carriage and releasably held adjacent the hub portion 34 of the carriage by a swinging latch 70. Thus, the cover plate 66 can be swung out of the way on the hinges 68 after the latch 70 is released if it becomes necessary to change the saw blade 50.

Cutting fluid is supplied to the saw 50 during the cutting operation by flexible conduits 74 positioned on both sides of the saw blade and connected to conduit 76 suitably valved as at 78 and carried by the saw carriage 32. The conduit 76 is connected to a conduit 80 having a telescopic fit with a conduit 82 extending into a reservoir 84 for the cutting fluid. Preferably the conduit 82 has a pump 85 and a driving motor 86 associated therewith which is started and stopped by one set of push buttons on the unit 88 associated with the main control panel 90. It should be noted that the bed 20 of the apparatus between the pedestals 22 and 24 is open so that the cutting fluid flowing from the conduits 74 over the saw blade and work will flow down through the opening and into the reservoir 84. Usually I have found it advisable to provide suitable dams 87 at the sides of the bed 20 and extending between the pedestals 22 and 24 and of sufficient height so that cutting fluid cannot flow out at the sides of the bed when the apparatus is working but must flow through the opening in the top of the bed 20 and down into the cutting fluid reservoir 84.

Figure 8:
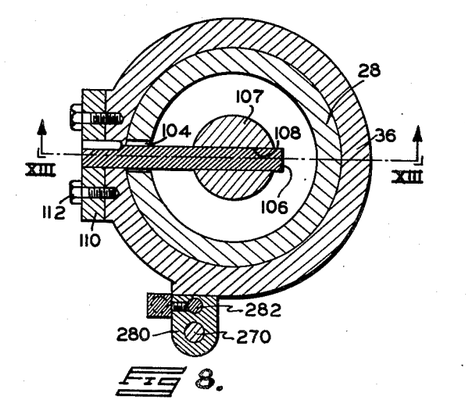
Fig. 8 is a horizontal cross-sectional view taken substantially on line VIII—VIII of Fig. 3.
Figure 12:
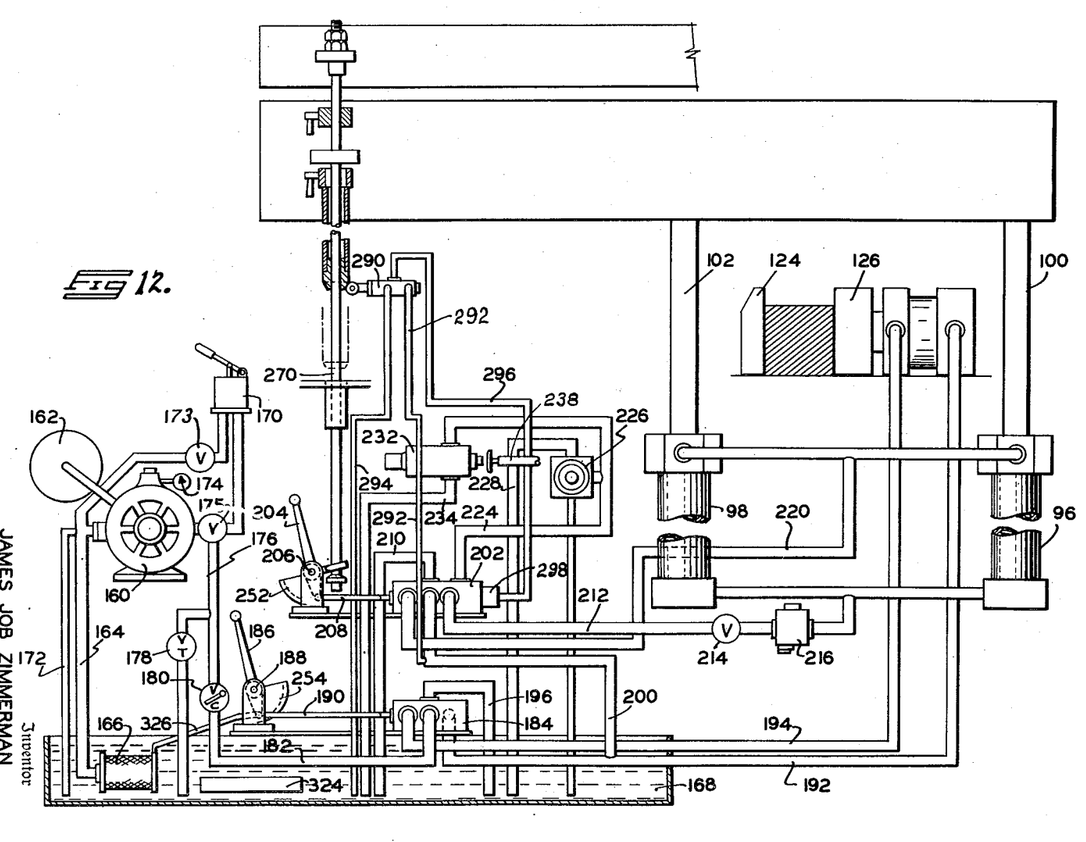
Fig. 12 is a schematic diagram of the hydraulic control system of the complete apparatus.
Figure 13:
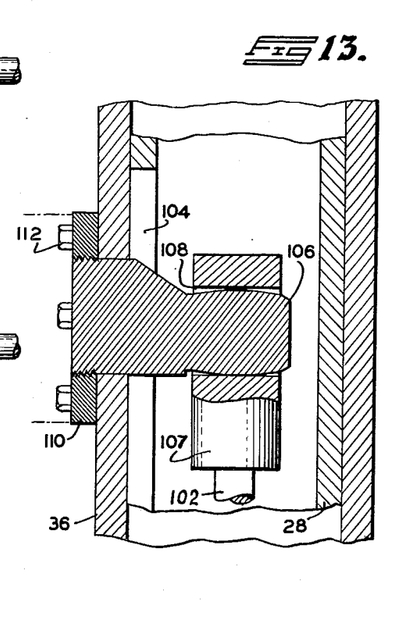
Fig. 13 is a vertical cross-sectional view taken on line XIII—XIII of Fig. 8.

The position of the carriage 32 on the columns 26 and 28 is controlled by a pair of hydraulic cylinders received within the bed 20 and pedestals 22 and 24, and not shown in Fig. 1 but appearing in Fig. 12, and designated by the numerals 96 and 98. The hydraulic cylinders includes piston rods 100 and 102 which extend up through the columns 26 and 28, respectively, and which are connected to the hub portions 34 and 36 of the carriage 32. This is achieved in the manner shown in Figs. 8 and 13 from which it will be seen that each column is formed with a vertical slot 104 through which slidably extends a bar 106 secured to a clevis 107 by extending through an appropriate slot 108 therein, and with the other end of the bar 106 being secured to an anchor plate 110 in turn fastened by screws 112 to the hub portion of the carriage. The clevis 107 is secured to the upper end of the piston rod. Thus, operation of the hydraulic cylinders 96 and 98 causes vertical movement of the carriage. By making the top and bottom of the bar 106 on a curve where it extends through the slot 108 in the clevis 107 a more flexible and universal connection is provided which will compensate for any possible small inequalities in positioning or carriage movement.

Figure 10:
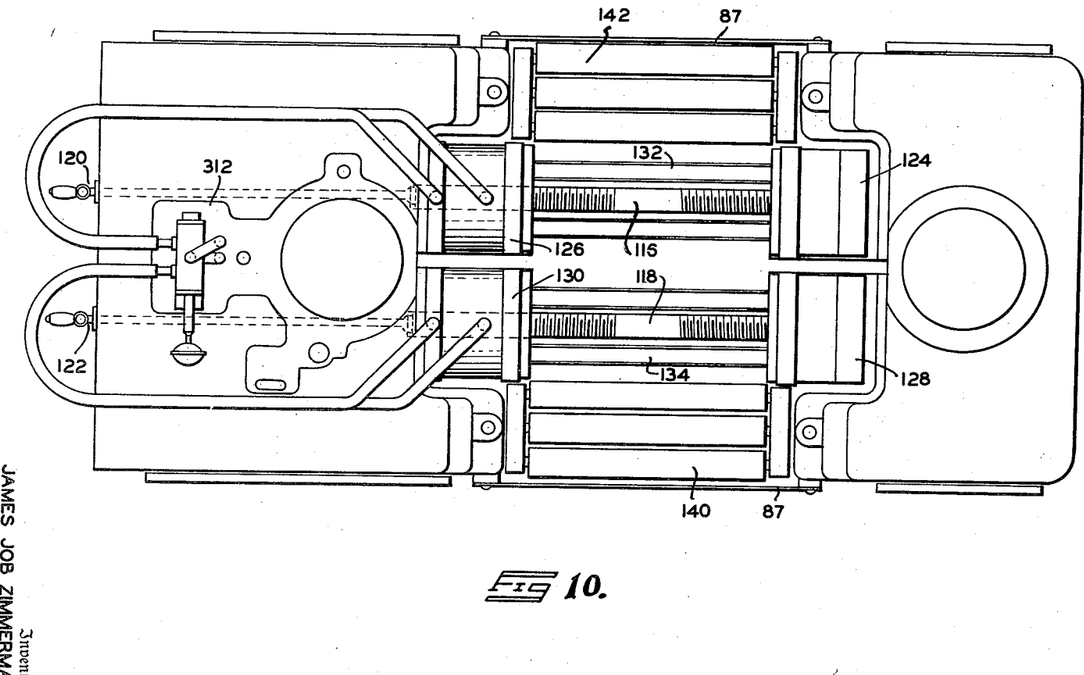
Fig. 10 is a partial plan view of the bed of the apparatus and particularly illustrating the hydraulic control and mounting of the vises.

Having particular reference now to Figs. 1 and 10, it will be evident that positioned between the pedestals 22 and 24 are one or more vises. It should be understood that the apparatus of my invention may employ only one vise if the billet B or other work to be sawed can be reversed end for end by suitable mechanism which may sometimes be associated with the saw. However, I particularly contemplate the use of two vises with the billet B, or other work, being held by one vise when sawed on one end and with the billet then being moved straight through the apparatus and held by the other vise for the sawing of the other end of the billet. This provides a straight through feeding of the work piece or billet B and facilitates the sawing operation. Accordingly, I have illustrated and will describe my apparatus as employing two vises.

Specifically, and as best seen in Fig. 10, journalled between the pedestals 22 and 24 are a pair of screws 116 and 118 which have screw driver-like shaft extensions secured thereto at the inner side of the pedestal 24 with the extension extending out through the outer side of the pedestal 24 and to which are secured cranks 120 and 122. By the use of shaft extensions on the screws 116 and 118 I am able to lift out the screws and vises substantially as a unit, and as hereinafter described. Each screw is provided with a left and a right hand thread which extend through suitably tapped openings in portions of the vise parts 124, 126, 128, and 130, which parts are slidably carried on parallel rails 132 and 134 extending between the pedestals and on the top of the bed 20. Accordingly, rotation of the crank 120 moves the parts 124 and 126 of one vise toward or from each other and rotation of the crank 122 moves the parts 128 and 130 of the second vise toward or from each other. It will be understood that this construction insures that the billet B or other work is always positioned exactly centrally beneath the saw arbor 42. Further, by this construction the bed of the vises is always in vertical alignment with any approach or run-out tables or conveyors regardless of the size or shape of the work piece.

Of course, the adjustment of the screws 116 and 118 does not achieve the actual clamping pressure on the vise parts but provides merely a coarse adjustment for generally positioning the vise parts adjacent the work to be clamped with the actual clamping action being achieved by hydraulic means. More particularly, the vise parts 126, 130 each include an hydraulic piston and associated clamping jaw movable outwardly from the body of the vise part upon the flow of hydraulic fluid under pressure behind the piston. The clamping jaw of the vise parts 126 and 130 can be moved to the retracted position by supplying hydraulic fluid under pressure to the opposite side of the pistons. The means for supplying fluid to the opposite ends of the pistons in the vise parts 126 and 130 will be hereinafter described.

Positioned between the pedestals 22 and 26 and to the side of the vises just described are a plurality of rollers which are conveniently formed as two groups 140 and 142. Preferably each group of rollers is mounted as a unit and in a releasable manner to the bed 20 of the apparatus so that the entire roller unit can be removed relatively quick from the bed of the apparatus. It should be noted here that the same opening in the bed of the apparatus which provides for the flow of the cutting fluid back into the reservoir 84 provides an opening through which the chips cut in the sawing operation may fall and be washed by the cutting fluid and these will be caught in a chip pan 146 from which the chips may be removed periodically through a side door 148 in the bed of the apparatus. Actually, the cutting fluid falls first into the chip pan 146 before passing through suitably screened openings into the reservoir 84.

Turning now to the consideration of the hydraulic control system incorporated in the apparatus, and from which the remaining structure of the apparatus not above specifically described will be understood, the numeral 160 indicates a pump, preferably of the automatic variable volume and adjustable constant pressure control type, which is housed in the bed 20 of the apparatus and which is adapted to be driven by a moisture-proof electric motor 162 controlled by a set of push buttons mounted in the unit 88 associated with the control panel 90 of the apparatus. The pump 160 is connected by a conduit 164 with a filter 166 positioned in an oil sump or reservoir 168 carried in the bed 20 of the apparatus. A hand pump 170 is connected across the inlet and outlet of the pump 160 so that if for any reason the power to the pump 160 should fail the hand pump 170 can be suitably actuated to achieve the necessary power, for example, to raise the saw carriage. Valves 173 and 175 may be closed or opened to isolate either the hand or power driven pumps. A drip drainage conduit 172 extends from the pump 160 to the oil sump 168, and the pump includes a fluid pressure gage 174 which is conveniently positioned upon the control panel 90 of the apparatus.

The outlet of the pump 160 is connected to a conduit 176 which extends through a loop or by-pass throttle valve 178 back to the oil sump 168 and this valve is positioned on the control panel 90 so that by appropriately adjusting the valve 178 any surge in the hydraulic conduits is eliminated when starting the pump 160. By fully opening the valve 178 the oil can be circulated through the pump and back into the sump without being forced into the remainder of the hydraulic system. A check valve 180 is positioned in the conduit 176 and this valve holds the oil in the remainder of the hydraulic system and prevents back flow thereof into the pump or through the valve 178.

From the check valve 180 a conduit 182 extends to a four-way valve 184. The four-way valve 184 is operated by a vise control lever 186 mounted upon a shaft 188 and connected by a link 190 to the valve. The lever 186 is positioned on the front of the control panel 90. Throwing the lever 186 to the left moves the four-way valve 184 so that fluid flows through a conduit 192 to clamp the vise. Throwing the lever 186 to the right moves the four-way valve 184 so as to pass fluid to a conduit 194 to unclamp the vise. With the lever 186 in the vertical position the valve 184 is in the neutral position and fluid from the conduit 182 passes through the four-way valve 184 and out a conduit 196 which returns the fluid to the sump 168.

Connected to the conduit 192, and thus getting fluid under pressure only when fluid under pressure is in conduit 192, is a conduit 200 which extends to a five-way valve 202 which controls the operation of the hydraulic cylinders 96 and 98. The position of the five-way valve 202 is controlled by a lever 204 mounted on a shaft 206 and having a link 208 extending to the five-way valve. The lever 204 is mounted on the front of the control panel 90 of the apparatus, and with the lever in the vertical or neutral position the fluid passing through the conduit 200 to the five-way valve 202 passes out a conduit 210 and is returned to the sump 168.

When the lever 204 is thrown to the right to cause the upward movement of the saw carriage the five-way valve is positioned so that fluid passes from the conduit 200 through the five-way valve 202 through a conduit 212 and into the bottom of the hydraulic cylinders 96 and 98 to raise the piston rods 100 and 102 and thus the saw carriage 32. Positioned in the conduit 212 is a manually operated locking or safety valve 214 which is normally open but which may be closed to hold the saw carriage in any adjusted position and prevent the saw carriage from sagging or dropping when the apparatus is apt to stand for a considerable time, for example over night or longer, without use. Also, positioned in the conduit 212 is a restraining and counterbalancing valve 216. This valve permits free flow of fluid in the direction towards the hydraulic cylinders 96 and 98 but provides a restrained flow of fluid in adjustable amounts in the opposite direction. This valve is set in the adjustment and operation of the apparatus so as to substantially counterbalance the weight of the saw carriage 32. In other words, the valve 216 will not open to permit the flow of fluid away from the bottom of the hydraulic cylinders 96 and 98 until the pressure on the fluid at the bottom of the hydraulic cylinders, i. e. under the pistons, is greater than a pressure counterbalancing the weight of the saw carriage. During the upward movement of the pistons in the hydraulic cylinders 96 and 98 fluid is exhausted freely and without restraint from the upper side of the pistons by way of a conduit 220 which extends to and through the five-way valve 202 so that fluid is exhausted out through the conduit 210 and is returned to the sump 168.

Now when the lever 204 is moved to the left or down position the five-way valve 202 is positioned so that fluid passing into the valve 202 from the conduit 200 flows into a conduit 220 to apply a pressure to the top side of the hydraulic cylinders 96 and 98. Now the downward movement of the pistons in the hydraulic cylinders cannot occur until fluid is exhausted from the underside of the pistons and from the bottoms of the hydraulic cylinders through the conduit 212. The restraining valve 216 functions to prevent this exhausting of the fluid until such time as the pressure on the fluid in the bottom of the hydraulic cylinders is sufficiently greater than that caused by the weight of the saw carriage as to cause the opening of the restraining valve 216. Fluid now flows through the conduit 212 to the five-way valve 202. From the five-way valve the fluid being exhausted flows through a conduit 224 to a flow control valve 226 having an adjustable orifice therein through which the fluid must flow to reach a conduit 228 which returns the fluid to the sump 168. The flow control valve 226 is carried on the control panel 90 so that the downward speed or feeding movement of the saw carriage 32 can be readily controlled and adjusted.

It might be noted here that the saw blade 50 is preferably driven at a relatively high peripheral speed so as to provide a relatively high surface cutting speed, and the downward feeding movement of the saw carriage is relatively light so as to provide the combination of light feed and high cutting speed.

I have found it to be particularly advantageous to provide both a controlled slow down speed for the saw carriage and a fast down speed for the saw carriage, particularly if the fast down speed has certain safety features incorporated therewith. To this end, I provide a by-pass valve 232 which is connected to an extension of the conduit 224 and from which a conduit 234 returns the fluid to the sump 168. Normally the valve 232 is closed so that the fluid flowing from the bottom of the hydraulic cylinders 96 and 98 must pass through the flow control valve 226. However, by opening the valve 232 the fluid passing through the conduit 224 may by-pass the flow control valve 226 and flow rapidly and in large amounts through the by-pass valve 232 which brings about a rapid downward movement of the saw carriage as long as the valve 232 is open.

Figure 4:
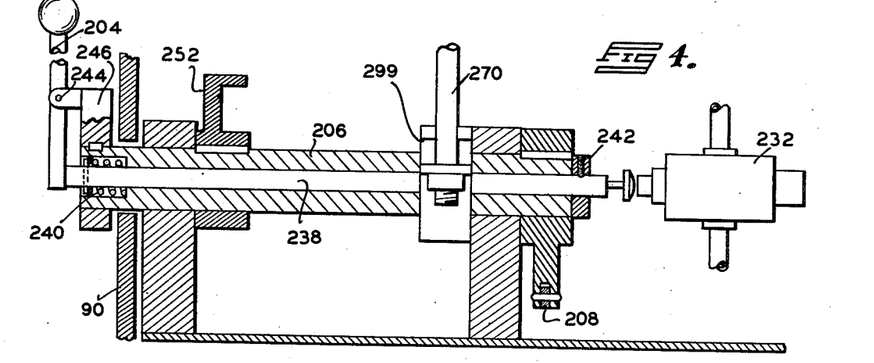
Fig. 4 is a longitudinal cross-sectional view taken substantially on line IV—IV of Fig. 1 and on a larger scale, and illustrating details of the feed control means and the rapid-down mechanism.

Looking now at Fig. 4 of the drawings I have therein illustrated one particular embodiment of apparatus for achieving the desired results. Specifically, the shaft 206 carrying the lever 204 is journalled in suitable bearings and is provided with a hollow center slidably receiving a rod 238 which is resiliently urged outwardly of the shaft 206 by a compression spring 240, with a collar 242 limiting this movement but not preventing movement of the rod 238 in the opposite direction upon the compression of the spring 240. The lever 204 is pivotally mounted, as at 244, upon a hub 246 secured to the shaft 206 and so that the end of the lever 204 remote from the rod 238 can be pulled outwardly away from the surface of the control panel 90 to thereby move the rod 238 inwardly of the shaft 206 against the compression of the spring 240. This movement of the rod 238 causes the rod to engage with the operating plunger of the valve 232 which is aligned with the rod to thereby open the valve 232 and by-pass the fluid around the flow control valve 226.

By this arrangement of parts the lever 204 can be readily moved from either the neutral to the up or down position by swinging the lever in an arc parallel to the surface of the control panel 90, and with a fast up speed but an adjustable and relatively slow down speed resulting when the lever is thrown in one direction or the other. When the lever is thrown to the controlled down speed if the operator merely pulls out on the lever 204 to move the end thereof away from the control panel 90 the by-pass valve 232 is opened to give a fast down speed to the saw carriage 32 as long as the operator holds out on the lever 204. However, once the operator leaves go of the lever 204 the compression spring 240 will return the lever to the position shown in Fig. 4 and the by-pass valve 232 closes to thereby return the downward movement of the saw carriage to the slow controlled down speed. This arrangement of parts thus provides a safety feature in that the operator of necessity must have his hand on the control to achieve a fast down speed.

One of the important safety features of my invention is the provision of interlock means between the vise control lever 186 and the saw control lever 204. Specifically, I have found it advisable to so interlock the operation of the vise and saw that it is impossible to move the saw carriage unless the vise is clamped, and it is impossible to unclamp the vise when the saw carriage is moving. I achieve this result by the use of interlocking arcuate segments associated with the levers 186 and 204. Particularly, I secure an arcuate segment 252 to the shaft 206 mounting the lever 204 of the saw control, and I secure an arcuate segment 254 to the shaft 188 mounting the vise control lever 186. Each of the arcuate segments 252 and 254 is formed with a right angle flange at its outer periphery with the flanges being notched at 256 and 258 respectively.

Figure 5:
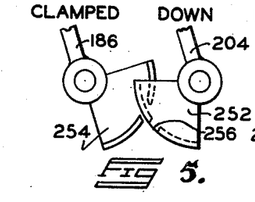
Figs. 5, 6, and 7 are diagrammatic views illustrating the various positions of the interlock between the vise clamping and saw feeding means.
Figure 6:
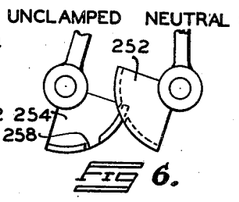
Figure 7:
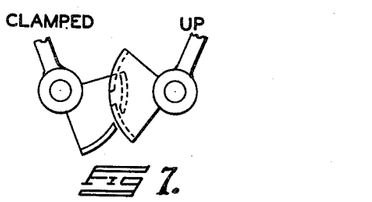

Now as will be evident from Figs. 5, 6, and 7, and having particular reference to Fig. 6, with the saw control lever 204 in an upright or neutral position the notch 256 is so positioned that the right angle flange on the arcuate segment 254 of the vise control lever 186 can be moved through the notch 256 so that the vise control lever 186 can be moved to the clamped or unclamped position freely and at will. However, when the vise control lever 186 is either in the neutral or in the unclamped position the saw control lever 204 cannot be moved out of neutral for the reason that the right angle flange on the arcuate segment 252 will strike the right angle flange on the arcuate segment 254. It is only when the vise control lever 186 is moved to the clamped position shown in Fig. 5 of the drawings that the slot 258 in the right angle flange of the arcuate segment 254 aligns itself with the right angle flange of the arcuate segment 252 so as to permit the saw control lever 204 to be thrown to either the up or down position. Moreover, once the saw control lever 204 is moved to either the up or down position the vise control lever 186 cannot be moved since the slot 256 associated with the saw control lever 204 has now moved away from the right angle flange on the arcuate segment 254 so that the vise cannot be unclamped, as will be evident from an inspection of Figs. 5 and 7.

Figure 3:
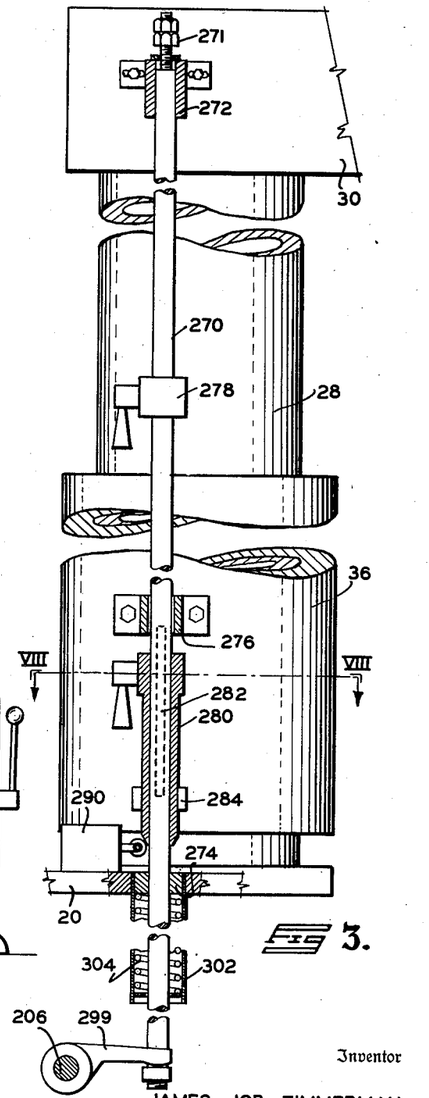
Fig. 3 is an enlarged fragmentary elevation, partly in section, and particularly illustrating the adjustable feed control means associated with the apparatus.

Incorporated with my improved apparatus are means for automatically stopping the downward movement of the saw carriage upon the completion of a cut, automatic means for reversing the movement of the saw carriage and automatic means for stopping the movement of the saw carriage when it has returned to its upper position. Referring particularly to Figs. 3 and 12, these means in the embodiment of my invention illustrated include a rod 270 which is slidably keyed for limited vertical movement in a bearing 272 secured to the head portion 30 of the apparatus and in a bearing 274 positioned on the bed 20 of the apparatus. Nuts 271 on the top end of the rod adjustably limit downward movement of the rod. The rod 270 also slidably extends freely through a stop block 276 secured to the hub portion 36 of the saw carriage.

The rod 270 slidably carries a stop 278 which is adapted to be clamped in any desired position on the rod 270 so as to provide a limit stop for the upward movement of the saw carriage as hereinafter particularly described. Slidably carried on the rod 270 beneath the stop block 276 is a cylindrical cam 280, and the cam is adapted to be clamped in any adjustable position to a rod 282 carried between the stop block 276 and a bracket 284 on the hub portion 36 and so that the rod 282 is parallel to the rod 270 but is positioned behind it. Thus, the cylindrical cam 280 is adapted to be clamped in any vertical position on the rod 282 and is carried with the hub portion 36 in any desired fixed but adjustable vertical relation therewith.

Supported upon the bed 20 adjacent the rod 270 is a valve 290 having a roller plunger adapted to be engaged by the lower end of the cylindrical cam 280 so that the downward movement of the cam as occasioned by the downward movement of the saw carriage causes the operation of the valve 290. The valve 290 is a three-way valve having a conduit 292 extending therefrom to the conduit 200 and supplying pressure to the valve 290 as long as the saw is being operated. Unless and until the cylindrical cam 280 operates the valve 290 fluid under pressure remains in the conduit 292 and is blocked off by the valve 290. However, when the cylindrical cam 280 moves past the valve 290 to operate it fluid flows from the conduit 292 through the valve 290 and into a conduit 296. The conduit 296 extends to a pressure cylinder 298 associated with the five-way valve 202, and the operation of the pressure cylinder causes a reversal of the valve 202 to cause the fluid to flow to the bottom side of the hydraulic cylinders 96 and 98 instead of to the top side. The reversal of the valve 202 also swings the lever 204 from the down position to the up position, and, of course, the saw carriage moves up instead of down.

The saw carriage will continue to move upwardly until the stopblock 276 on the hub portion 36 of the carriage 32 strikes the stop 278 and at this time the continued upward movement of the saw carriage lifts the rod 270. As the rod 270 lifts it moves an arm 299 connected to the shaft 206 to swing the lever 204 back to neutral position so that the saw carriage stops in its upward position. When the cylindrical cam 280 moves away from the valve 290 the fluid in pressure cylinder 298 is open to exhaust by way of conduit 296, valve 290 and a conduit 294 extending to the sump 168. With the five way valve in neutral position the conduits to both the top and bottom of the hydraulic cylinders 96 and 98 are blocked as will be understood.

By appropriately adjusting the position of the cylindrical cam 280 in association with the saw carriage the extent of downward movement of the saw carriage is determined and controlled as well as the point of reversal of feed, and by appropriately adjusting the stop 278 on the rod 270 the extent of upward movement of the saw carriage is determined and controlled.

Referring particularly to Fig. 3 of the drawings, I preferably mount the bearing 274 for the lower end of the rod 270 so that the complete downward movement of the saw carriage for any reason would not result in the breakage of any of the parts. To this end, I secure a cylindrical casing 302 to the bed 20 with the casing slidably receiving the bearing 274 and with the position of the bearing being determined by a compression spring 304 secured at its lower end to the cylindrical casing 302. Thus, the bearing 274 is free, when struck by the lower end of the cylindrical cam 280, to yield downwardly into the cylindrical casing 302 by the resilient action of the compression spring 304 and yet no dirt or chips are permitted to get into the inside of the bed of the apparatus.

It should be noted in conjunction with Fig. 12 that for the sake of simplicity I have shown the control lever 186 positioned below and to the left of control lever 204. Actually, the levers are preferably positioned adjacent to each other on the same horizontal level so that the arcuate segments 252 and 254 associated therewith are in cooperating relation as shown in Figs. 5, 6, and 7 and above described.

Figure 11:
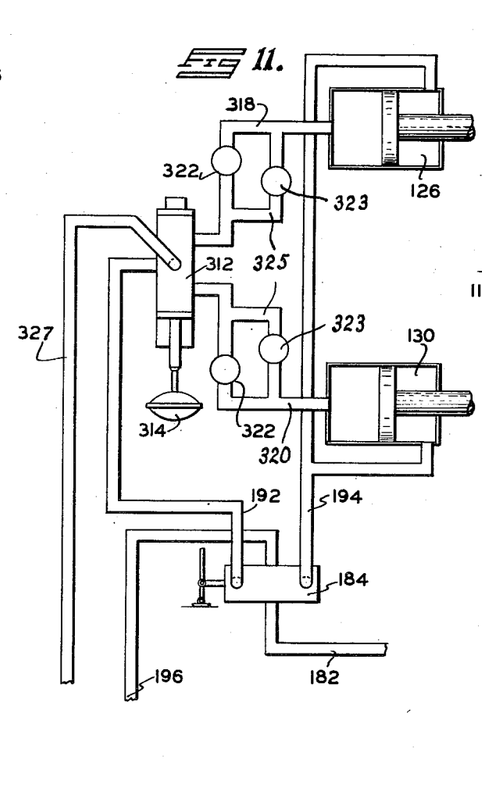
Fig. 11 is a schematic diagram of the hydraulic control system for the vises.

Returning now to the hydraulic control system for the vises, and having particular reference to Fig. 11 of the drawings, the four-way valve 184 when employed in conjunction with two vises has the conduits 192 and 194 extending respectively to a selector valve 312 and to the exhaust sides of the vises 126 and 130. The selector valve 312 is mounted on top of the pedestal 24, and includes an operating plunger 314 which extends toward the control panel 90 of the apparatus and which can be readily grasped by the operator of the apparatus to position the selector valve so that fluid under pressure is supplied either to the vise 126 or to the vise 130. With the plunger 314 pushed in fluid is supplied by a conduit 318 to the inlet or clamping side of the vise 126, and when the plunger 314 is pulled out fluid is supplied by a conduit 320 to the inlet or clamping side of the vise 130. Each one of the conduits 318 and 320 may include a pressure-dropping means 322 of adjustable character and of the type adapted to drop the pressure to any desired value. The use of pressure-dropping means is often advantageous so that the relatively heavy hydraulic pressure used to clamp large billets can be dropped to within safe operating ranges when sawing a tube or other work piece of a section which might be collapsed if too heavy hydraulic pressure were used on the vises. Plug valves 323 positioned in suitable by-pass conduits 325 may be opened when full clamping pressure is desired and closed when flow through the pressure dropping means 322 is required. An exhaust conduit 327 extends from the selector valve 312 to the sump 168 and it should be understood that the one of the conduits 318 or 320 which is not receiving pressure is connected through the selector valve 312 to the exhaust conduit 327.

The hydraulic control system just described provides certain advantages in that only one of the vises can be operated at a time and because the vises are normally held in a retracted position where they do not interfere with the handling of a work piece. Specifically, when the vise control lever 186 is thrown to unclamp the vises, fluid passes from the conduit 182 through the four-way valve 184 and into the conduit 194 to move each vise to the unclamped position. In this movement should the pistons of both vises be in the clamping position fluid will be exhausted from one of the vises back through the conduit to the selector valve 312 and then out through the exhaust conduit 327. Fluid will be exhausted from the other of the vises through the conduit back to the selector valve 312 and then through the conduit 192, the four-way valve 184, and the conduit 196. This is true regardless of the in or out position of the control plunger 314.

Preferably I include an electric heater 324 in association with the oil sump 168 so that proper operating temperature may be maintained on the oil even though the saw should be used under varying temperature conditions. A thermostat and start-stop control 329 for the heater is positioned on the control panel 90. Further, I preferably extend a rod 326 between the vise control lever 186 and the oil filter 166 so that movement of the lever 186 effects a movement and cleaning of the filter 166.

From the foregoing it is believed that the construction and operation of the apparatus will be completely understood. It might be noted that the apparatus may be employed in conjunction with conveyors or tables of constant height for moving in the billets or other work pieces to be cut and with the work pieces being fed in from one side of the apparatus and removed from the other. By the provision of two vises the vise on one side of the plane of the saw can be used to hold the work piece when one end of the work piece is sawed off. The work piece will then be pushed towards the other end of the bed 20 and the other vise will be used to hold the work piece while the other end thereof is cut off. A wide variety of sizes and shapes of work pieces can be readily cut by my improved apparatus which can be quickly adjusted to expedite any given sawing operation or series of sawing operations.

The speed and extent of the downward movement of the saw carriage can be readily and accurately controlled and adjusted. The reversal feeding movement and the stopping of the saw carriage upon completion of the reversal movement is automatic. Changes of saw blades is a relatively simple operation by opening the cover 66 and removing the nut 57, washer 56 and driving hub 55. It is substantially impossible to damage the cantilever saw arbor 42 inasmuch as the saw blade 50 is carried by the hub 55 which can be appropriately designed so that any shearing or breakage will occur in the hub 55. Sawing speeds can be controlled by varying the gear box 40 or by providing an adjustable speed motor 38. The motor 38 is adapted to be controlled by push buttons mounted in the unit 88 on the control panel 90, and a load ammeter 340 for the motor may also be mounted on the panel. My invention includes safety and interlocking control means which render the operation thereof substantially fool-proof and facilitates and expedites sawing operations on steel billets and the like.

While in accordance with the patent statutes I have specifically illustrated and described one embodiment of my invention, it should be particularly understood that I am not to be limited thereto or thereby, but that the scope of my invention is defined in the appended claims.

I claim:

1. The combination in a rotary metal saw or the like of a frame, a carriage movable vertically of the frame, hydraulic cylinders for moving the carriage vertically, a fluid sump, an automatic variable volume and adjustable contant pressure pump connected to the sump, power means for driving the pump, a hand operated pressure pump by-passing the power driven pump, multi-way valve means connected to the output of the power driven pump, conduits connecting the valve means to the top and bottom sides of the hydraulic cylinders, a one-way adjustable restraining valve positioned in the conduit extending to the bottom side of the cylinders and having a restrained flow in the opposite direction whereby to substantially counterbalance the weight of the carriage, an adjustable orifice valve, a conduit extending from the multi-way valve to the orifice valve and therethrough to the sump so that fluid exhausted from the bottom side of the cylinders must pass through the orifice valve, means for by-passing the fluid around the orifice valve, lever means for positioning the multi-way valve to obtain either upward or downward movement of the carriage, push rod means associated with and operable by the lever means for manually opening the last-named by-pass means to achieve a fast-down movement of the carriage, and a pair of fluid pressure means one being positioned adjacent the carriage and operated by the movement of the carriage for automatically operating the other fluid pressure means positioned adjacent the multi-way valve for reversing the position of the multi-way valve to reverse the movement of the carriage.

2. The combination in a rotary metal saw or the like of a frame, a carriage movable vertically of the frame, hydraulic cylinders for moving the carriage vertically, a fluid sump, a pressure pump connected to the sump, power means for driving the pump, multi-way valve means connected to the output of the power driven pump, conduits connecting the valve means to the top and bottom sides of the hydraulic cylinders, a one-way adjustable restraining valve positioned in the conduit extending to the bottom of the hydraulic cylinders so that fluid is free to flow to the bottom side of the cylinders but has a restrained flow in the opposite direction whereby to substantially counterbalance the weight of the carriage, an adjustable orifice valve, a conduit extending from the multi-way valve to the orifice valve and therethrough to the sump so that fluid exhausted from the bottom side of the cylinders must pass through the orifice valve after passing through the multi-way valve, means for by-passing the fluid around the orifice valve, lever means for positioning the multi-way valve to obtain either upward or downward movement of the carriage, and push rod means mounted on and operable with the lever means for opening the by-pass means to achieve a fast-down movement of the carrier.

3. The combination in a rotary metal saw or the like of a frame, a carriage movable vertically of the frame, hydraulic cylinders for moving the carriage vertically, a fluid sump, an adjustable constant pressure pump connected to the sump, power means for driving the pump, multi-way valve means connected to the output of the power driven pump, conduits connecting the valve means to the top and bottom sides of the hydraulic cylinders, hydraulic means to substantially counterbalance the weight of the carriage, an adjustable orifice valve, a conduit extending from the multi-way valve to the orifice valve and therethrough to the sump so that fluid exhausted from the bottom side of the cylinders must pass through the orifice valve, means for by-passing the fluid around the orifice valve, lever means for positioning the multi-way valve to obtain either upward or downward movement of the carriage, normally inoperative, push rod means operated by the lever means for opening the by-pass means to achieve a fast-down movement of the carriage, and adjustably positioned means operated by the movement of the carriage for automatically reversing the position of the multi-way valve to reverse the movement of the carriage.

4. The combination in a rotary metal saw or the like of a frame, a carriage movable vertically of the frame, hydraulic cylinders for moving the carriage vertically, a fluid sump, an adjustable constant pressure pump connected to the sump, power means for driving the pump, multi-way valve means connected to the output of the power driven pump, conduits connecting the valve means to the top and bottom sides of the hydraulic cylinders, means to substantially counterbalance the weight of the carriage, an adjustable orifice valve, a conduit extending from the multi-way valve to the orifice valve and therethrough to the sump so that fluid exhausted from the bottom side of the cylinders must pass through the orifice valve, means for by-passing the fluid around the orifice valve, manual control means for positioning the multi-way valve to obtain either upward or downward movement of the carriage, means operated by the manual control means for opening the by-pass means to achieve a fast-down movement of the carriage, spring means in said opening means to normally render them inoperative.

5. In combination in a metal saw or the like, a frame, a carriage movable vertically of the frame, hydraulic cylinders for moving the carriage vertically, a fluid sump, a pump connected to the sump, power means for driving the pump, a hand operated pressure pump by-passing the power driven pump, multi-way valve means connected to the output of the power driven pump, conduits connecting the valve means to the top and bottom sides of the hydraulic cylinders, and means for positioning the multi-way valve to obtain either upward or downward movement of the carriage.

6. In combination in an hydraulically controlled metal saw and the like. a frame, a carriage having vertical sliding movement on the frame, hydraulic cylinders for raising and lowering the carriage on the frame, valve means for controlling the flow of fluid to the top or the bottom of the cylinders, a rod supported for limited vertical movement on its axis on the frame, a cam on the carriage and adapted to be adjusted in vertical position thereon, said cam at least partially surrounding and sliding on the rod, fluid pressure control means on the frame and adapted to be engaged by the cam to cause the reversing of the position of the valve means and cause an upward movement of the carriage, a stop adjustably secured to the rod above the carriage, a stop block fixed on the carriage and slidably surrounding at least part of the rod and adapted to engage the stop near the upper limit of movement of the carriage to raise the rod, means connecting the rod to the valve means so that upward movement of the rod moves the valve means to neutral position and stops movement of the carriage, a bearing in the frame for the lower end of the rod, and means resiliently supporting the bearing for yielding movement axially of the rod.

7. In combination in an hydraulically controlled metal saw and the like, a frame, a carriage having vertical sliding movement on the frame, hydraulic cylinders for raising and lowering the carriage on the frame, valve means for controlling the flow of fluid to the top or the bottom of the cylinders, a rod supported for limited vertical movement on its axis on the frame, a cam on the carriage and adapted to be adjusted in vertical position thereon, said cam at least partially surrounding and sliding on the rod, fluid pressure control means on the frame and adapted to be engaged by the cam to cause the reversing of the position of the valve means and cause an upward movement of the carriage, a stop adjustably secured to the rod above the carriage, a stop block fixed on the carriage and slidably surrounding at least part of the rod and adapted to engage the stop near the upper limit of movement of the carriage to raise the rod, and means connecting the rod to the valve means so that upward movement of the rod moves the valve means to neutral position and stops movement of the carriage.

8. In combination in a saw or the like, a frame, a carriage having vertical sliding movement on the frame, power means for raising and lowering the carriage on the frame, a rod supported for limited vertical movement on its axis on the frame, a cam on the carriage and adapted to be adjusted in vertical position thereon, said cam slidably surrounding the rod, means on the frame and adapted to be struck by the cam to reverse the operation of the power means and cause an upward movement of the carriage, a stop adjustably secured to the rod above the carriage, a stop block fixed on the carriage and slidably surrounding the rod and adapted to engage the stop near the upper limit of movement of the carriage to raise the rod, means connecting the rod to the power means so that upward movement of the rod moves the power means to neutral position and stops movement of the carriage.

9. In combination in a saw or the like, a frame, a carriage having vertical sliding movement on the frame, power means for raising and lowering the carriage on the frame, a rod supported for limited vertical movement on its axis on the frame, a cam on the carriage and adapted to be adjusted in vertical position thereon, said cam being slidably associated with the rod means on the frame and adapted to be struck by the cam to reverse the operation of the power means and cause an upward movement of the carriage, a stop adjustably secured to the rod above the carriage, a stop block fixed on the carriage, and adapted to engage the stop near the upper limit of movement of the carriage to raise the rod, means connecting the rod to the power means so that upward movement of the rod moves the power means to neutral position and stops movement of the carriage.

10. A metal saw or the like including a frame, a carriage supported for vertically reciprocable movement on the frame, hydraulic pressure motors for raising and lowering the carriage on the frame, hydraulically actuated vise means for clamping a work piece on the frame beneath the carriage, a lever controlled valve means for supplying fluid under pressure to one side or the other of the motors, a lever controlled valve means for opening or closing the vise means, means mechanically interlocking the several lever controlled valve means so that the vise means cannot be opened unless the carriage is at rest and the carriage cannot be moved unless the vise means are closed.

11. An hydraulically actuated saw for metal billets and the like and comprising a bed, pedestals mounted at the ends of the bed, vertical columns mounted on the pedestals, a head portion securing the upper ends of the columns together, a carriage slidably supported on the columns, a circular saw blade, an arbor carrying the saw, cantilever bearings supporting the arbor on the carriage so that the saw blade is on the center line between the columns, a frangible driving connection between the arbor and the saw blade and positioned to the side of the blade remote from the bearings, a motor and variable speed gear box on the carriage for driving the arbor, a pair of hydraulic vise means positioned on the bed between the pedestals, one vise means lying on one side of the plane of the saw and the other on the other side of the plane of the saw, right and left hand screw means supporting the opposed jaws of each vise means at equal distances from the axis of the saw arbor, selector means whereby only one vise means can be operated hydraulically at a time, hydraulic cylinders in the bed and pedestals and having piston rods extending up axially of the columns, and flexible rocking clevis and bar means for securing each piston rod to the carriage through appropriate slots in the columns.

12. An hydraulically actuated saw for metal billets and the like and comprising a bed, columns mounted on the bed, a head portion securing the upper ends of the columns together, a carriage slidably supported on the columns, a circular saw blade, an arbor carrying the saw, cantilever bearings supporting the arbor on the carriage so that the saw blade is substantially on the center line between the columns, a frangible driving connection between the arbor and the saw blade and positioned to the side of the blade remote from the bearings, a motor on the carriage for driving the arbor, and hydraulic cylinders in the bed and having piston rods extending up through the columns and secured to the carriage.

13. Apparatus of the character described and comprising a bed, pedestals mounted at the ends of the bed, a pair of vise means positioned on the bed between the pedestals, one vise means lying on one side of substantially the longitudinal center line of the bed and the other on the other side of the longitudinal center line, adjustable right and left hand screw means supporting and adjustably positioning the opposed jaws of each vise means at equal distances from the transverse center line of the bed, hydraulic means for moving a jaw of each vise means, and selector means whereby only one vise means can be operated hydraulically at a time.

JAMES JOB. ZIMMERMAN.